United States Patent
Ickinger (12)

(10) Patent No.: US 7,004,742 B2
(45) Date of Patent: Feb. 28, 2006

(54) LINEAR DRIVE FOR AN INJECTION MOLDING MACHINE

(75) Inventor: Georg Michael Ickinger, Graz (AT)

(73) Assignee: Demag Ergotech GmbH, Schwaig (DE)

( * ) Notice: Subject to any disclaimer, the term of this patent is extended or adjusted under 35 U.S.C. 154(b) by 0 days.

(21) Appl. No.: 10/980,634

(22) Filed: Nov. 3, 2004

(65) Prior Publication Data
US 2005/0064064 A1    Mar. 24, 2005

Related U.S. Application Data

(63) Continuation of application No. PCT/EP03/02590, filed on Mar. 13, 2003.

(30) Foreign Application Priority Data
May 10, 2002    (DE) ................................ 102 20 819

(51) Int. Cl.
   *B29C 45/77*    (2006.01)
(52) U.S. Cl. ................. 425/149; 425/405.2; 425/451.7
(58) Field of Classification Search ................ 425/452, 425/149, 405.2, 451.7
See application file for complete search history.

(56) References Cited

U.S. PATENT DOCUMENTS

| 4,601,653 A | | 7/1986 | Inaba |
| 5,912,020 A | * | 6/1999 | Grunitz ...................... 425/595 |
| 5,980,235 A | | 11/1999 | Eppich et al. |
| 6,796,782 B1 | * | 9/2004 | Bauer ......................... 425/149 |
| 6,802,195 B1 | * | 10/2004 | Quint ....................... 425/405.2 |

FOREIGN PATENT DOCUMENTS

| JP | 2000 141434 A | 5/2000 |
| WO | WO 02/085600 A | 10/2002 |

\* cited by examiner

*Primary Examiner*—Tim Heitbrink
(74) *Attorney, Agent, or Firm*—Henry M. Feiereisen

(57) ABSTRACT

A linear drive for an injection molding machine includes a housing defining a sealed interior space containing a gas volume. The housing has two housing portions constructed for telescopic movement within one another. A spindle drive is accommodated in the housing and operated by the electric motor. The spindle drive includes a spindle shaft, which is axially securely fixed to one of the housing portions, and a spindle nut, which is arranged on the spindle shaft and axially securely fixed to the other one of the housing portions. Acting on the spindle drive is an energy accumulator which is constructed for discharge in a first operating cycle which is energy-intensive and for recharging in a second operating cycle which is opposite to the first operating cycle and requires little energy.

7 Claims, 2 Drawing Sheets

LINEAR DRIVE FOR AN INJECTION MOLDING MACHINE

CROSS-REFERENCES TO RELATED APPLICATIONS

This application is a continuation of prior filed copending PCT International application no. PCT/EP03/02590, filed Mar. 13, 2003, which designated the United States and on which priority is claimed under 35 U.S.C. §120, the disclosure of which is hereby incorporated by reference, and which claims the priority of German Patent Application, Serial No. 102 20 819.0, filed May 10, 2002 pursuant to 35 U.S.C. 119(a)–(d).

BACKGROUND OF THE INVENTION

The present invention relates, in general, to a linear drive for an injection molding machine.

Nothing in the following discussion of the state of the art is to be construed as an admission of prior art.

U.S. Pat. No. 5,980,235 describes an injection drive in the form of a spindle drive with an electric motor for an injection molding machine. During the injection phase, the operation of the electric motor is assisted by an energy accumulator in the form of a compression spring assembly which acts parallel to the electric motor. The compression spring assembly is increasingly tensed and recharged during the return stroke of the spindle drive, which spring tension is continuously decreased in correspondence to the spring characteristic, as the spindle drive undergoes the forward stroke.

It would be desirable and advantageous to provide an improved linear drive for an injection molding machine, which has a compact construction and protects internal components against contamination and which can easily be adjusted to the respective areas of receiving and releasing forces.

SUMMARY OF THE INVENTION

According to one aspect of the present invention, a linear drive for an injection molding machine includes a housing defining a sealed interior space containing a gas volume, wherein the housing has two housing portions constructed to allow telescopic movement within one another, an electric motor, a spindle drive operated by the electric motor and accommodated in the housing, wherein the spindle drive includes a spindle shaft axially securely fixed to one of the housing portions, and a spindle nut arranged on the spindle shaft and axially securely fixed to the other one of the housing portions, and an energy accumulator acting on the spindle drive and constructed for discharge in a first operating cycle which is energy-intensive and for recharging in a second operating cycle which is opposite to the first operating cycle and requires little energy.

As a result of the configuration of a linear drive according to the present invention, a movement of the spindle shaft in relation to the spindle nut causes the housing portions to either move toward one another to thereby compress the trapped gas volume, or to move apart in which case the previously produced gas pressure during compression of the gas volume assists this movement of the housing portions.

The use of a linear drive according to the invention is applicable in particular for an injection unit of an injection molding machine. Of course, a linear drive according to the invention is equally applicable as drive for the ejector or the clamping unit of an injection molding machine.

The electric motor may or may no be enclosed by the housing portions of the housing. In an embodiment, in which the electric motor is not enclosed by the housing, the overall construction can be made especially simple when the spindle shaft and the spindle nut are both securely fixed to one housing portion, and one housing portion is rotatably connected to the electric motor, whereas the other housing portion is restrained against rotation. At least one of the housing portions, normally the non-rotatable housing portion, may hereby be constructed for movement in an axial direction.

In an embodiment, in which the electric motor is enclosed by the housing, both housing portions are each restrained against rotation and so constructed as to move together in an axial direction. A very compact construction can be realized by constructing the electric motor with a stator that is securely fixed to one of the housing portions, while the spindle nut or the spindle shaft is rotatably supported in one of the housing portions but fixed in place in axial direction and can be caused to rotate by the electric motor.

In order to allow the linear drive to impose holding forces, even without assistance from the electric motor, a controllable coupling may be provided for blocking the spindle drive.

A compensation of installation tolerances and adjustment of the force-application zone in which the energy accumulator operates can be realized by connecting the gas volume in the housing with an external compressed gas source.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
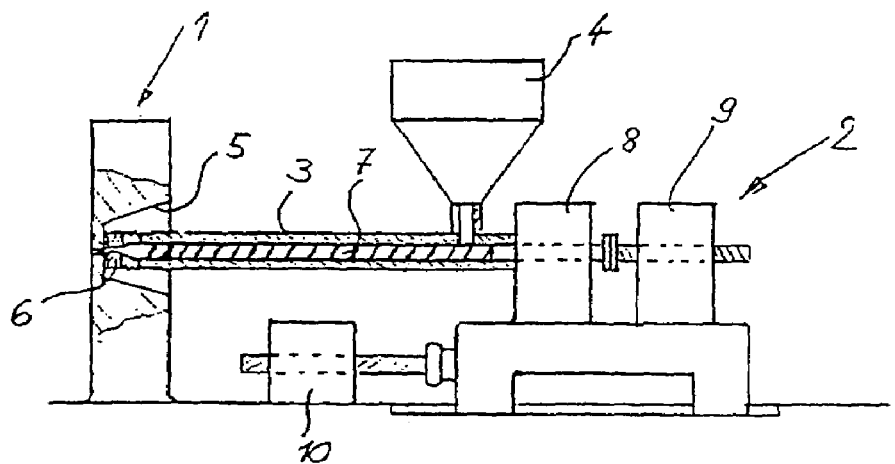
FIG. 1 is a schematic illustration of an exemplary injection molding machine having incorporated therein the subject matter according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of an exemplary injection molding machine which includes as main components a clamping unit, generally designated by reference numeral 1 and shown only partially, and an injection unit 2 which is mounted on a machine bed and movable in a linear direction of the clamping unit 1. The injection unit 2 includes a plasticizing barrel 3, a feed hopper 4 positioned at a rear zone of the plasticizing barrel 3, and an injection nozzle 6 disposed on a forward end of the plasticizing barrel 3. The injection nozzle 6 is resilient and firmly pressed against the gate 5 of the clamping unit 1 during the injection and holding pressure phase. Disposed in the plasticizing barrel 3 for rotation and movement in axial direction is a plasticizing screw 7, whereby the plasticizing screw 7 is caused to rotate by a rotary drive 8 and moved in linear direction by a linear drive 9. A further linear drive 10 controls the movement of the injection unit 2 upon the machine bed.

As is generally known, during rotation of the plasticizing screw 7, so-called plasticizing and metering phase, plastic material entering through the feed hopper 4 is plasticized and moved forward to the tip of the plasticizing screw 7. As a result of the rotation of the plasticizing screw 3, plastic material accumulates there. The plasticizing and metering phase requires only little energy and forces. Following the metering phase is the injection phase in which the accumulated plastic material is injected into an injection mold, as the plasticizing screw 3 is moved forward by the linear drive 9. The injection phase is enemy-intensive and requires application of high forces to realize the injection of plastic material.

Figure 2:
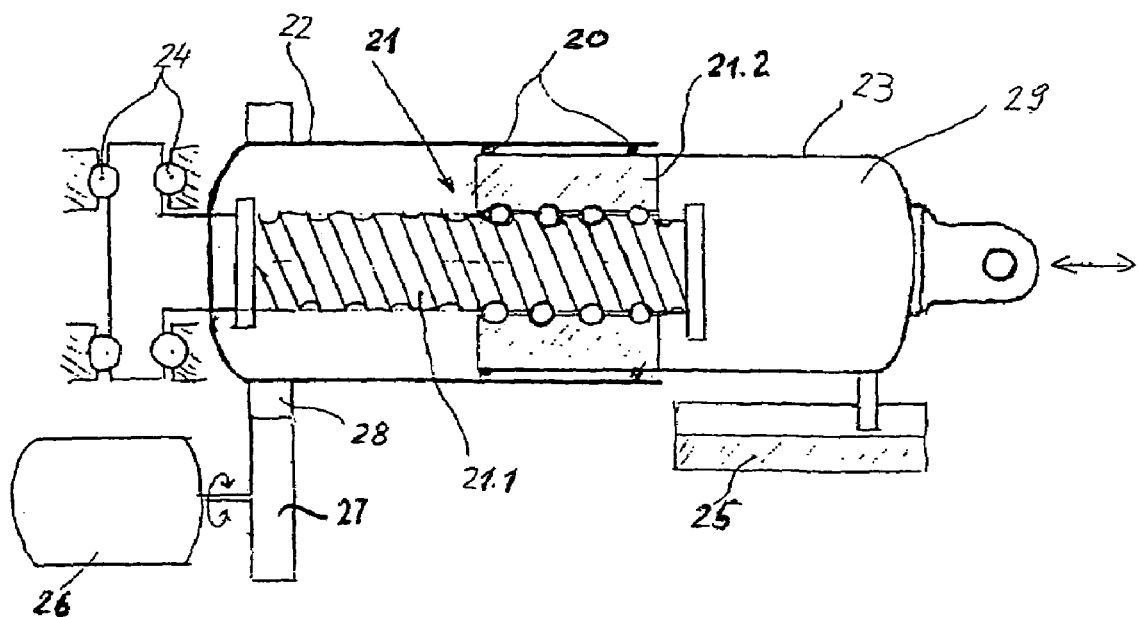
FIG. 2 is a schematic illustration of one embodiment of a linear drive according to the present invention for incorporation in the injection molding machine of FIG. 1.
Figure 3:
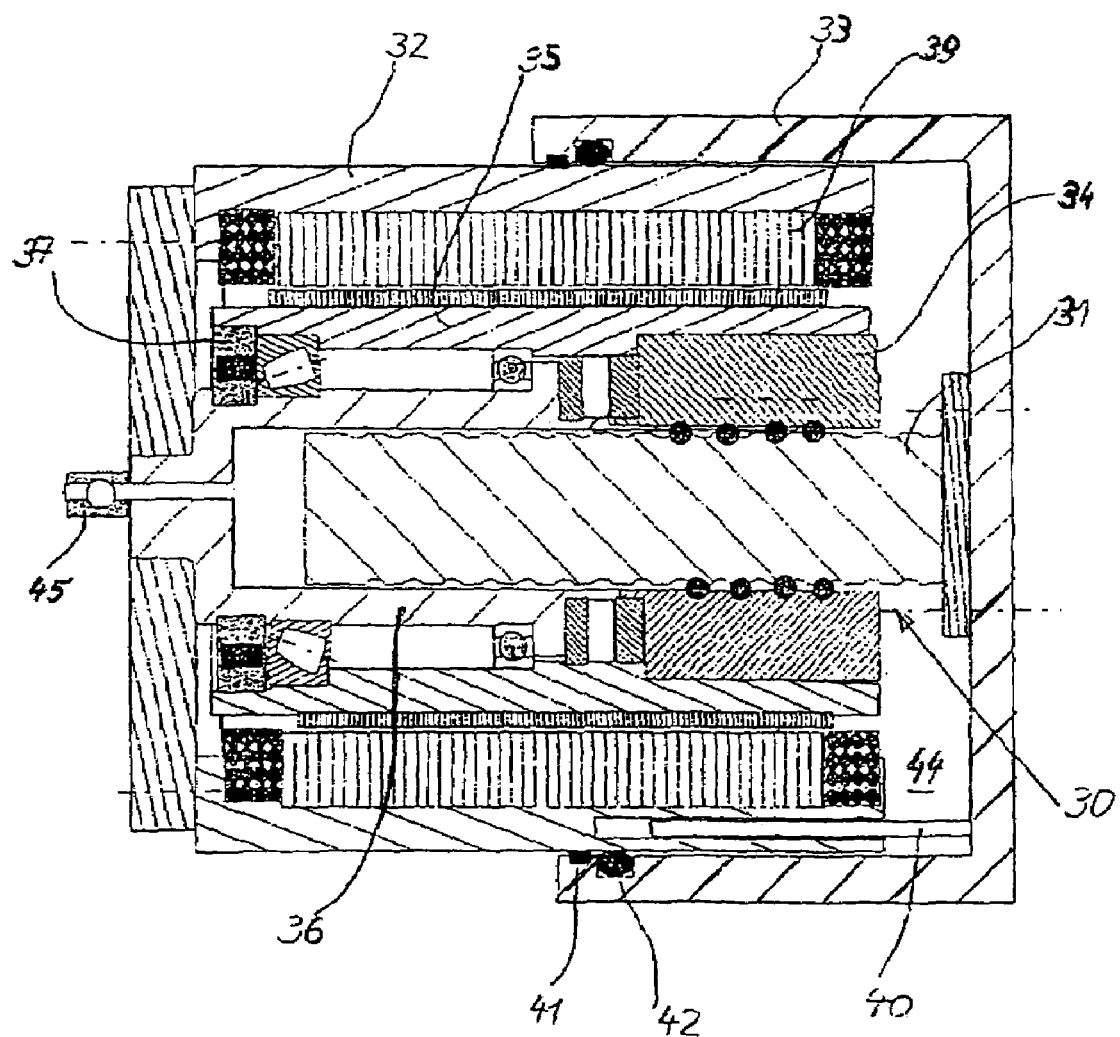
FIG. 3 is a schematic illustration of another embodiment of a linear drive according to the present invention for incorporation in the injection molding machine of FIG. 1.

Both linear drives 9, 10 are constructed as electromotive spindle drives and illustrated in more detail in FIGS. 2 and 3 by way of two embodiments.

Referring now to FIG. 2, there is shown a schematic illustration of one embodiment of a linear drive according to the present invention, depicting schematically the base components of the linear drive. The linear drive is constructed as a spindle drive, generally designated by reference numeral 21 and including a spindle shaft 21.1 and a spindle nut 21.2 mounted on the spindle shaft 21.1. The spindle drive 21 is enclosed by a cylindrical two-part housing having a housing portion 22 which, in the non-limiting example of FIG. 2, is securely connected to the spindle shaft 21.1, and another housing portion 23 which is securely connected to the spindle nut 21.2. Whereas the housing portion 22 is supported by bearings 24 for rotation but fixed in place in axial direction, the housing portion 23 is restrained against rotation in a guide 25 but able to move in axial direction. An electric motor 26 is connected via driving wheels 27, 28 with the housing portion 22 such that the housing portion 22 can rotate. As shown in FIG. 2, both housing portions 22, 23 can move telescopically within one another and define an interior space 29 which is hermetically sealed off by seals 20 and contains a gas volume.

When the housing portion 22 is caused to rotate by the electric motor 26, the spindle shaft 21.1 rotates as well in view of the fixed securement of the spindle shaft 21.1 to the housing portion 22. As a result, the spindle nut 21.2 mounted non-rotatably on the spindle shaft 21.1 moves linearly in axial direction. Depending on the rotation direction, the housing portion 23, which is securely fixed to the spindle nut 21.2, moves either into the housing portion 22 to thereby relieve the gas volume in the interior space 29, or moves out of the housing portion 22 to thereby compress the gas volume in the interior space 29. In the compression phase, the energy levels rises and energy can be stored until released during the expansion phase. In other words, pressure of the gas volume builds up during the plasticizing and metering phase, and is released to assist the injection phase.

FIG. 3 shows a schematic illustration of another embodiment of a linear drive which is of compact configuration and includes a cylindrical two-part housing defining a cylinder axis and having housing portions 32, 33. The linear drive is also configured as a spindle drive, generally designated by reference numeral 30 and including a spindle shaft 31 and a spindle nut 34 arranged on the spindle shaft 31. The spindle shaft 31 is firmly secured in the housing portion 33 in coaxial relationship to the cylinder axis, whereas the spindle nut 34 is rotatably supported by means of a rotor in the form of a hollow tube 35 upon a carrier 36 which in turn is firmly secured coaxially in the housing portion 32. The hollow tube 35 can be connected via a controllable coupling 37 with the carrier 36 and thus can be coupled non-rotatably with the housing portion 32. The housing portion 32 has an inside wall for attachment of the stator 39 of an electric motor having electromagnetic fields that act upon the rotor and thus upon the hollow tube 35. Both housing portions 32, 33 are interconnected non-rotatably but movable relative to one another via guides 40, 41 to thereby define an enclosed interior space 44 which contains a gas volume and is hermetically sealed by seals 42 against the surroundings. Connection port 45 provides a fluid communication between the interior space 44 and a compressed gas source (not shown).

When the stator 39 is excited electromagnetically and the coupling 37 is open, the rotor and thus the spindle nut 34 are caused to rotate so that the spindle shaft 31, depending on the rotation direction, executes a linear movement to the left or to the right. A movement of the spindle shaft 31 to the left causes a movement of the housing portion 33 in the direction of the housing portion 32 to thereby compress the gas volume in the interior space 44 to build up pressure and accumulate energy. The thus stored energy is released again, when the housing portion 33 moves to the right to thereby assist the electric motor in its rotation direction. In some cases, when the power demand is slight, it may even be possible to replace the operation of the electric motor altogether.

The interior space 44 can be filled with compressed gas via the connection port 45. In this way, it is possible to adjust either the force-free zero position of the linear drive or the respective force-application zone in which the linear drive is supposed to operate.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An injection molding machine having a linear drive, said linear drive comprising:
    a housing defining a sealed interior space containing a compressible gas volume, said housing having two housing portions constructed to allow telescopic movement of one portion inside another;
    an electric motor;
    a spindle drive operated by the electric motor and accommodated in the housing, said spindle drive including a spindle shaft axially securely fixed to one of the housing portions, and a spindle nut arranged on the spindle shaft and axially securely fixed to the other one of the housing portions; and an energy accumulator formed by said gas volume being compressed when one of said housing portions moves toward the other, said accumulator constructed for discharge by relieving compressible gas volume in a first operating cycle having a first required energy and for recharge in a second operating cycle which is opposite to the first operating cycle and requires less energy than the first operating cycle.

2. The injection molding machine of claim 1, wherein one of the housing portions is rotatably connected to the electric motor while the other one of the housing portions is restrained against rotation, and wherein at least one of the housing portions is constructed for movement in an axial direction.

3. The injection molding machine of claim 1, wherein the housing portions are each restrained against rotation and so constructed as to move together in an axial direction, said electric motor being enclosed by the housing portions.

4. The injection molding machine of claim 3, wherein the electric motor includes a stator securely fixed to one of the housing portions, with the spindle nut or the spindle shaft being supported in one of the housing portions for rotation but fixed in place in the axial direction and operatively connected to the electric motor for executing a rotation movement.

5. The injection molding machine of claim 4, and further comprising a controllable coupling for blocking the spindle drive.

6. The injection molding machine of claim 1, and further comprising an external compressed gas source, wherein the gas volume is in fluid communication with the external compressed gas source.

7. An injection molding machine having a linear drive, said linear drive comprising:

a housing defining a sealed interior space containing a gas volume, said housing having a stationary housing portion and a movable housing portion constructed to telescopically move in and out of the stationary housing portion; and a spindle drive for moving the movable housing portion in an axial direction in relation to the stationary housing portion, said spindle drive having a spindle shaft and a spindle nut arranged on the spindle shaft, wherein one of the spindle shaft and the spindle nut is secured to one housing portion and the other one of the spindle shaft and the spindle nut is secured to the other housing portion so that an axial movement of the movable housing portion into the stationary housing portion compresses the gas volume to thereby build up gas pressure, and an axial movement of the movable housing portion out of the stationary housing portion releases the gas pressure to assist an operation having a required energy.

* * * * *